US012801614B2

(12) United States Patent
Xing et al.

(10) Patent No.: US 12,801,614 B2
(45) Date of Patent: Nov. 17, 2026

(54) FACILITATING NATURAL LANGUAGE TO STRUCTURED QUERY LANGUAGE QUERIES USING STRING-BASED ENTITY LINKING AND SEMANTIC-BASED ENTITY LINKING TO ENRICH A DATABASE

(71) Applicant: ADOBE INC., San Jose, CA (US)

(72) Inventors: Junjie Xing, Ann Arbor, MI (US); Saurabh Tripathy, Hayward, CA (US); Kun Qian, Seattle, WA (US); Zifan Liu, San Jose, CA (US); Yunyao Li, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/982,897

(22) Filed: Dec. 16, 2024

(65) Prior Publication Data

US 2026/0169993 A1 Jun. 18, 2026

(51) Int. Cl.
*G06F 16/242* (2019.01)
*G06F 16/2452* (2019.01)
(Continued)

(52) U.S. Cl.
CPC .. *G06F 16/24578* (2019.01); *G06F 16/90344* (2019.01)

(58) Field of Classification Search
CPC ......... G06F 16/24578; G06F 16/90344; G06F 40/295; G06F 40/30; G06F 16/3344;
(Continued)

(56) References Cited

U.S. PATENT DOCUMENTS 10,042,921 B2 * 8/2018 Boguraev ........... G06F 16/3344
12,141,181 B2 * 11/2024 Gutta .................... G06F 40/216
(Continued)

FOREIGN PATENT DOCUMENTS

CN 114020768 A * 2/2022 ........... G06F 18/214
WO WO-2024064249 A1 * 3/2024 ......... G06F 16/3344

OTHER PUBLICATIONS

Mohammadjafari, Ali, Anthony S. Maida, and Raju Gottumukkala. "From natural language to sql: Review of llm-based text-to-sql systems." arXiv preprint arXiv:2410.01066 (2024). (Year: 2024).*
(Continued)

*Primary Examiner* — Dennis Truong
(74) *Attorney, Agent, or Firm* — Shook, Hardy & Bacon L.L.P.

(57) ABSTRACT

Methods and systems are provided for facilitating natural language to structured query language queries using string-based entity linking and semantic-based entity linking to enrich a database. In embodiments described herein, a user inputs a natural language query (NLQ) of a structured query language (SQL) database. A set of candidate entities are determined from entities of the database by applying (1) a string match from n-gram-based query candidates of the NLQ to string perturbations of the entities and (2) a semantic match from embeddings of n-gram-based query candidates to embeddings generated based on textual variations and classifications of the entities. A ranked set of candidate entities is determined from the set of candidate entities by a classifier trained to determine whether the candidate entity is relevant to the NLQ. A subset of the ranked set of candidate entities above a threshold score is displayed in response to the NLQ.

20 Claims, 12 Drawing Sheets

(51) Int. Cl.

| | |
|---|---|
| ***G06F 16/2457*** | (2019.01) |
| ***G06F 16/3329*** | (2025.01) |
| ***G06F 16/334*** | (2025.01) |
| ***G06F 16/903*** | (2019.01) |

(58) Field of Classification Search

CPC .... G06F 16/243; G06F 16/355; G06F 16/367; G06F 16/35; G06F 16/24522; G06F 16/3329

See application file for complete search history.

(56) References Cited

U.S. PATENT DOCUMENTS

| | | | | |
|---|---|---|---|---|
| 2020/0257679 | A1* | 8/2020 | Sheinin | G06N 3/08 |
| 2021/0019309 | A1* | 1/2021 | Yadav | G06F 16/2428 |
| 2021/0303638 | A1* | 9/2021 | Zhong | G06F 18/231 |
| 2023/0078177 | A1* | 3/2023 | Wang | G06F 16/24522 707/760 |
| 2024/0028629 | A1* | 1/2024 | Gutta | G06F 16/31 |
| 2025/0124023 | A1* | 4/2025 | Chan | G06F 16/243 |
| 2025/0284728 | A1* | 9/2025 | Monteiro | G06F 16/383 |

OTHER PUBLICATIONS

Bhaskar et al. “Benchmarking and Improving Text-to-SQL Generation under Ambiguity”; arXiv:2310.13659v1 [cs.CL] Oct. 20, 2023 (Year: 2023).*

Feuer et al. “ArcheType: A Novel Framework for Open-Source Column Type Annotation using Large Language Models”; arXiv: 2310.18208v3 [cs.CL] Aug. 19, 2024 (Year: 2024).*

* cited by examiner

FACILITATING NATURAL LANGUAGE TO STRUCTURED QUERY LANGUAGE QUERIES USING STRING-BASED ENTITY LINKING AND SEMANTIC-BASED ENTITY LINKING TO ENRICH A DATABASE

BACKGROUND

Entity linking generally refers to the process of associating text with corresponding entities in a database. For example, in the sentence "Mercury is visible in the night sky," entity linking would be used to associate "Mercury" with a database entity corresponding to the planet Mercury as opposed to a database entity corresponding to the chemical element Mercury. In this regard, entity linking involves resolving ambiguous terms in text to the correct database entities to enable accurate textual interpretation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating natural language to structured query language (NL2SQL) queries using string-based entity linking and semantic-based entity linking to enrich a database. For example, a user querying a particular database inputs a natural language query. N-gram-based query candidates are determined from the text of the query, such as by breaking the query into each uni-gram, bi-gram, and tri-gram contiguous sequences of words of the query. A set of candidate entities from entities of the particular database are determined from both (1) a string match between the n-gram-based query candidates to string perturbations of entities of the particular database and (2) a semantic match between embeddings of the n-gram-based query candidates to embeddings of textual variations and classifications of the entities of the particular database. To facilitate the string match, an entity linking engine enriches the particular database by determining string perturbations of each entity of the particular database and storing the string perturbations in association with each corresponding entity. In order to facilitate the semantic match, the entity linking engine enriches the particular database by computing embeddings based on language model-generated textual variations and classifications of the entities and storing the embeddings in association with each corresponding entity. After the set of candidate entities are determined from the string match and the semantic match, a query to a candidate entity ranking engine, such as a binary classifier trained to output a confidence score for each candidate entity based on whether the candidate entity is relevant to the input query, determines a ranked set of candidate entities based on the input query and the set of candidate entities. A subset of the ranked set of candidate entities above a threshold confidence score can then be displayed in response to the natural language query.

DETAILED DESCRIPTION

Definitions

Figure 1:
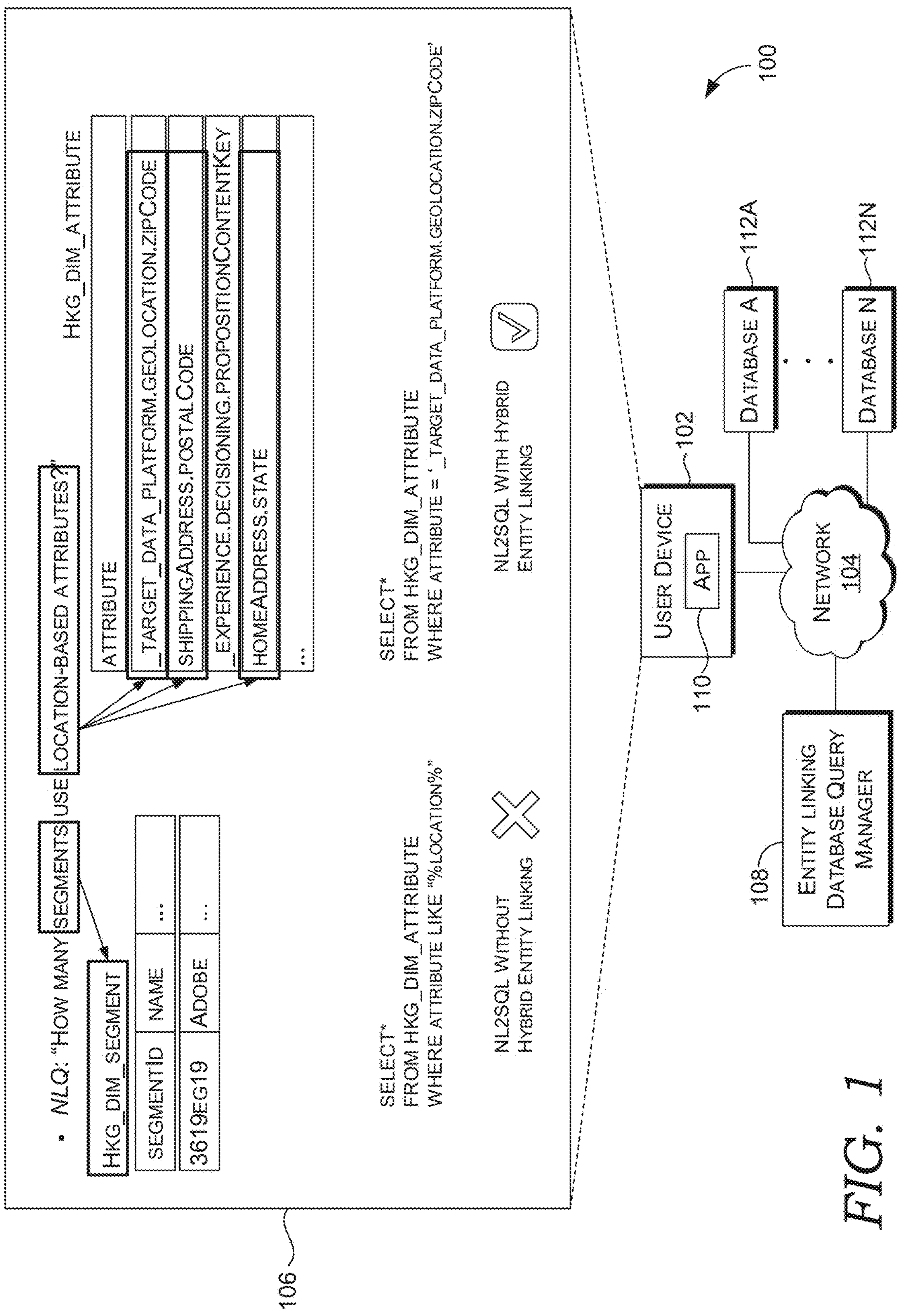
FIG. 1 depicts a diagram of an environment in which one or more embodiments of the present disclosure can be practiced, in accordance with various embodiments of the present disclosure.

Various terms are used throughout the description of embodiments provided herein. A brief overview of such terms and phrases is provided here for ease of understanding, but more details of these terms and phrases are provided throughout.

An "entity" or "database entity" generally refers to a database object representing an object, person, place, event, concept, and/or the like that is uniquely identified and stored as a record within a database, such as a structured query language (SQL) database, a knowledge graph-based database, and/or the like. Entities can correspond to tables, rows of a table, and/or columns of a table. The attributes in the rows and/or columns of the table corresponding to the entity define the properties of the entity and/or relationships with other entities. "Entity linking" generally refers to the process of associating text with corresponding entities in a database. In this regard, when querying databases with natural language input, entity linking involves resolving ambiguous terms in the natural language query (NLQ) to the correct database entities, such as table names, columns, or rows in order to enable accurate NLQ interpretation and execution.

"Natural Language to SQL" (NL2SQL) generally refers to techniques to translate NLQs into SQL statements, which allows users to retrieve or manipulate data from databases without requiring knowledge of SQL syntax. NL2SQL can use natural language processing (NLP) techniques to parse and interpret user input and generates corresponding SQL commands based on the database schema and context.

"String perturbations" generally refer to variations in the input text that may arise due to misspellings, synonyms, abbreviations, or typographical errors. String perturbation techniques can generate variations, such as misspellings ("employee" to "emploee"), typographical errors ("employee" to "employee"), case changes ("Employee" to "EMPLOYEE"), synonyms ("employee" to "staff"), abbreviations ("department" to "dept"), word boundary changes ("employee_id" to "employeeid"), phonetic variations of similar sounding characters or words ("employee" to "emploi"), noise insertion to add random or specific characters ("employee" to "employee"), cultural variations to adapt spellings for different locales ("color" to "colour"), and/or the like.

"String matching" or "string searching" generally refers to computational techniques to evaluate string similarity by comparing sequences of characters to identify exact or approximate matches to strings, such as words. Exact string matching identifies strings that are identical in sequence, character by character, without any deviations (e.g., "employee" matches "employee"), whereas fuzzy string matching or approximate string matching allows for minor differences, such as misspellings or variations (e.g., "employee" matches "emploee"), by measuring similarity using algorithms, such as Levenshtein distance, that measure the number of edits (e.g., substitutions or deletions) needed to transform one string into another.

"Semantic matching" or "semantic searching" generally refers to computational techniques to evaluate the semantic similarity of text by representing words or phrases as numerical vectors or embeddings. Any known technique can be used to generate the embeddings from text, such as transformer-based models (e.g., Bidirectional Encoder Representations from Transformers [BERT], Sentence-BERT [SBERT], and/or the like) and/or other models, such as Word2Vec. Semantic similarity between embeddings can be measured using any known technique, such as cosine similarity by calculating the cosine of the angle between vectors, Euclidean distance by measuring the distance between vectors, and/or any other known semantic similarity computational technique.

In this regard, "string-based entity linking" generally refers to entity linking using string matching techniques and "semantic-based entity linking" generally refers to entity linking using semantic matching techniques.

Figure 4:
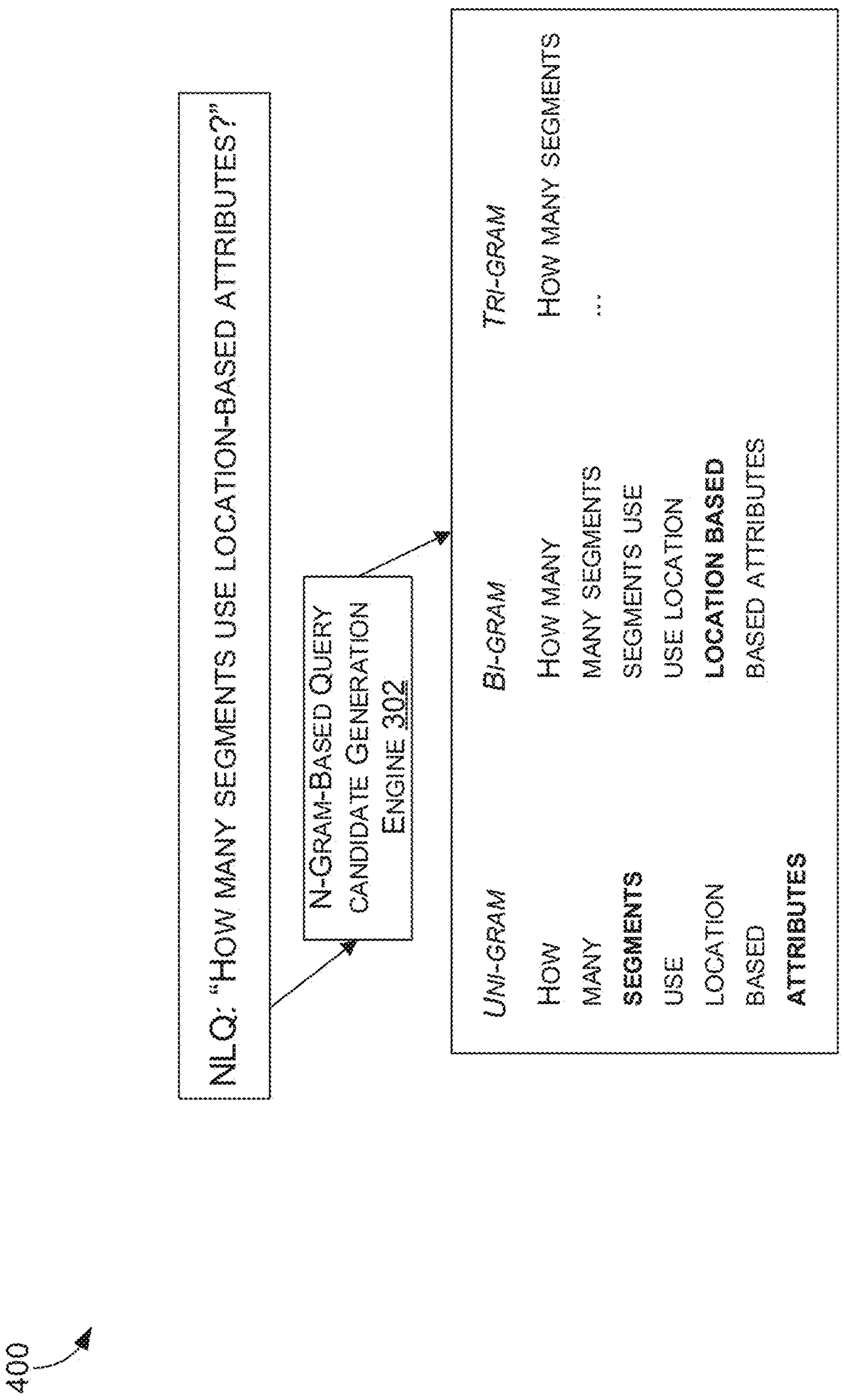
FIG. 4 provides an example diagram of generating n-gram-based query candidates based on a query, in accordance with embodiments of the present disclosure.

An "n-gram-based search" generally refers to a search algorithm that breaks text into contiguous sequences of "n" characters or words, referred to as "n-gram-based query candidates," and uses the n-gram-based query candidates for string matching and/or semantic matching. For example, a uni-gram can refer to each single word of the text, a bi-gram can refer to each sequence of two consecutive words of the text, and a tri-gram can refer to each sequence of three consecutive words of the text. As a more specific example, the word "employee" can be broken into bi-grams ("em," "mp," "pl," "lo," "oy," "ye," "ee"). As yet another specific example, as shown in FIG. 4, the query "how many segments use location-based attributes" can be broken into n-gram-based query candidates, including uni-grams ("how," "many," "segments," "use," "location," "based," and "attributes"), bi-grams ("how many," "many segments," "segments use," "use location," "location based," and "based attributes"), tri-grams ("how many segments," "many segments use," "segments use location," "use location based," and "location based attributes"), and/or other n-grams.

A "binary classifier model" generally refers to a computational model, such as a machine learning model, trained to categorize input data into one of two distinct classes. The binary classifier model can generate confidence scores representing the probability of the input data belonging to the particular class.

A "language model," such as a large language model (LLM), generally refers to an artificial intelligence (AI) system trained to understand and generate content, such as human-readable text and/or other multimedia, such as images, based on an input prompt.

Overview

Entity linking involves resolving ambiguous terms in text to the correct database entities to enable accurate textual interpretation. However, while prior entity linking techniques exist, prior entity linking techniques are often generalized and may not be able to capture database-specific entities required for NL2SQL. For example, a business may have unique entities specific to their business in their database or unique naming structures for entities that would not be captured by a generalized dataset. Therefore, prior entity linking techniques may not accurately associate text with database-specific entities. As a specific example, prior entity linking techniques may not accurately associate an entity named "userAccount.contactDetails.billingAddress" with "contact information" due to the unique naming structure of the SQL database entity.

Further, while prior entity linking techniques exist, each technique has its own particular limitations. For example, while rule-based approaches may provide better results in response to queries that include text that closely resembles the entity, a machine learning-based approach may provide better results in response to queries where the text is less similar to the entity. Thus, each prior entity linking technique may provide less accurate results dependent on how the user refers to a particular entity or set of entities in a particular query. When implementing NL2SQL queries, users will utilize text in the query that closely resemble an entity name (e.g., searching for "userAccount. contactDetails. billingAddress" with "Account_billingAddress") in some scenarios and, in other scenarios, users will utilize text corresponding to a natural language interpretation of an entity name (e.g., "userAccount. contactDetails. billingAddress" with "contact information"). As such, when implementing NL2SQL queries for a particular database (e.g., a database of a particular business), no single entity linking technique is likely able to provide the most accurate results, as the accuracy of the results will be dependent on how the particular user decides to structure the particular NL2SQL query.

Accordingly, unnecessary computing resources are utilized when users implement NL2SQL queries in conventional implementations. For example, computing and network resources are unnecessarily consumed to facilitate providing inaccurate results to NL2SQL queries due to unique entity names in particular databases and/or dependent on how the query refers to a particular entity. For instance, computer input/output operations are unnecessarily increased each time inaccurate results are presented in response to an NL2SQL query, as each query performed by the individual increases the number of input/output operations. Further, when information responsive to the query is located in a disk array, there is unnecessary wear placed on the read/write head of the disk of the disk array each time inaccurate results are presented in response to an NL2SQL query. Even further, when information responsive to the query is located over a network, the processing of operations each time inaccurate results are presented in response to an NL2SQL query decreases the throughput for a network, increases the network latency, and increases packet generation costs. Further, when NL2SQL queries provide inaccurate results, only engineers with specialized SQL syntax experience and extensive knowledge of the database being queried can query the particular database, thereby increasing computational complexity and computational expense.

As such, embodiments of the present disclosure are directed to facilitating NL2SQL queries using string-based entity linking and semantic-based entity linking to enrich a database in an efficient and effective manner. In this regard, an entity can be determined from a particular query based on candidate entities determined from both (1) a string matching algorithm between the particular query to string perturbations of entities of a database and (2) a semantic matching algorithm between an embedding of the particular query to embeddings of textual variations and classifications of the entities of the database.

Generally, and at a high level, embodiments described herein facilitate NL2SQL queries using string-based entity linking and semantic-based entity linking to enrich a database. For example, a user querying a particular database inputs a natural language query. N-gram-based query candidates are determined from the text of the query, such as by breaking the query into each uni-gram, bi-gram, and tri-gram contiguous sequences of words of the query. A set of candidate entities from entities of the particular database are determined from both (1) a string match between the n-gram-based query candidates to string perturbations of entities of the particular database and (2) a semantic match between embeddings of the n-gram-based query candidates to embeddings of textual variations and classifications of the entities of the particular database. In order to facilitate the string match, an entity linking engine enriches the particular database by determining string perturbations of each entity of the particular database and storing the string perturbations in association with each corresponding entity. To facilitate the semantic match, the entity linking engine enriches the particular database by computing embeddings based on language model-generated textual variations and classifications of the entities and storing the embeddings in association with each corresponding entity. After the set of candidate entities are determined from the string match and the semantic match, a query to candidate entity ranking engine, such as a binary classifier trained to output a confidence score for each candidate entity based on whether the candidate entity is relevant to the input query, determines a ranked set of candidate entities based on the input query and the set of candidate entities. A subset of the ranked set of candidate entities above a threshold confidence score can then be displayed in response to the natural language query.

Figure 3:
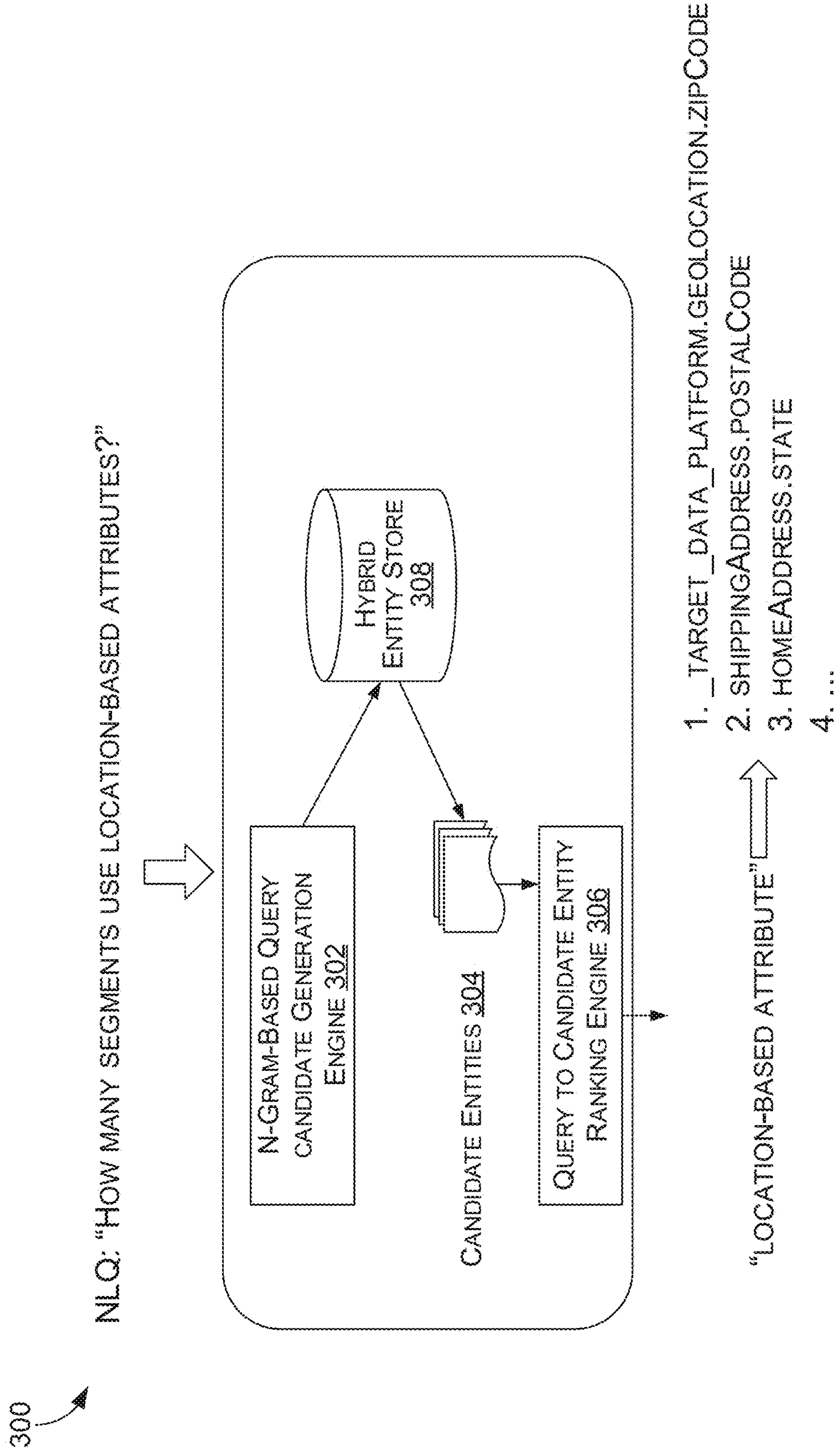
FIG. 3 provides an example diagram of facilitating NL2SQL queries using string-based entity linking and semantic-based entity linking to enrich a database, in accordance with embodiments of the present disclosure.

In operation, a user, such as a user querying a particular database (e.g., a database of a particular business), inputs a natural language query. The natural language query is accessed by a query engine. An example diagram of facilitating NL2SQL queries using string-based entity linking and semantic-based entity linking to enrich a database is shown in FIG. 3. In certain embodiments, a query preprocessing engine preprocesses the query, such as by removing punctuation, dashes, underscores, and/or the like.

In certain embodiments, after preprocessing the query, an n-gram-based query candidate generation engine determines n-gram-based query candidates from the text of the query. In certain embodiments, the n-gram-based query candidates can be generated by breaking the query into each contiguous sequence of words from each single word through the total number of words in the query. For example, for a query with four words, (1) uni-grams can be generated for each word in the query, (2) bi-grams can be generated for each contiguous sequence of two words in the query, (3) tri-grams can be generated for each contiguous sequence of three words in the query, (4) a quad-gram can be generated for the four contiguous words of the query, and/or any number of n-grams. In certain embodiments, the n-gram-based query candidates can be generated by only breaking the query into each uni-gram, bi-gram, and tri-gram contiguous sequences of words of the query. An example of generating n-gram-based query candidates based on a query is shown in FIG. 4.

Figure 5:
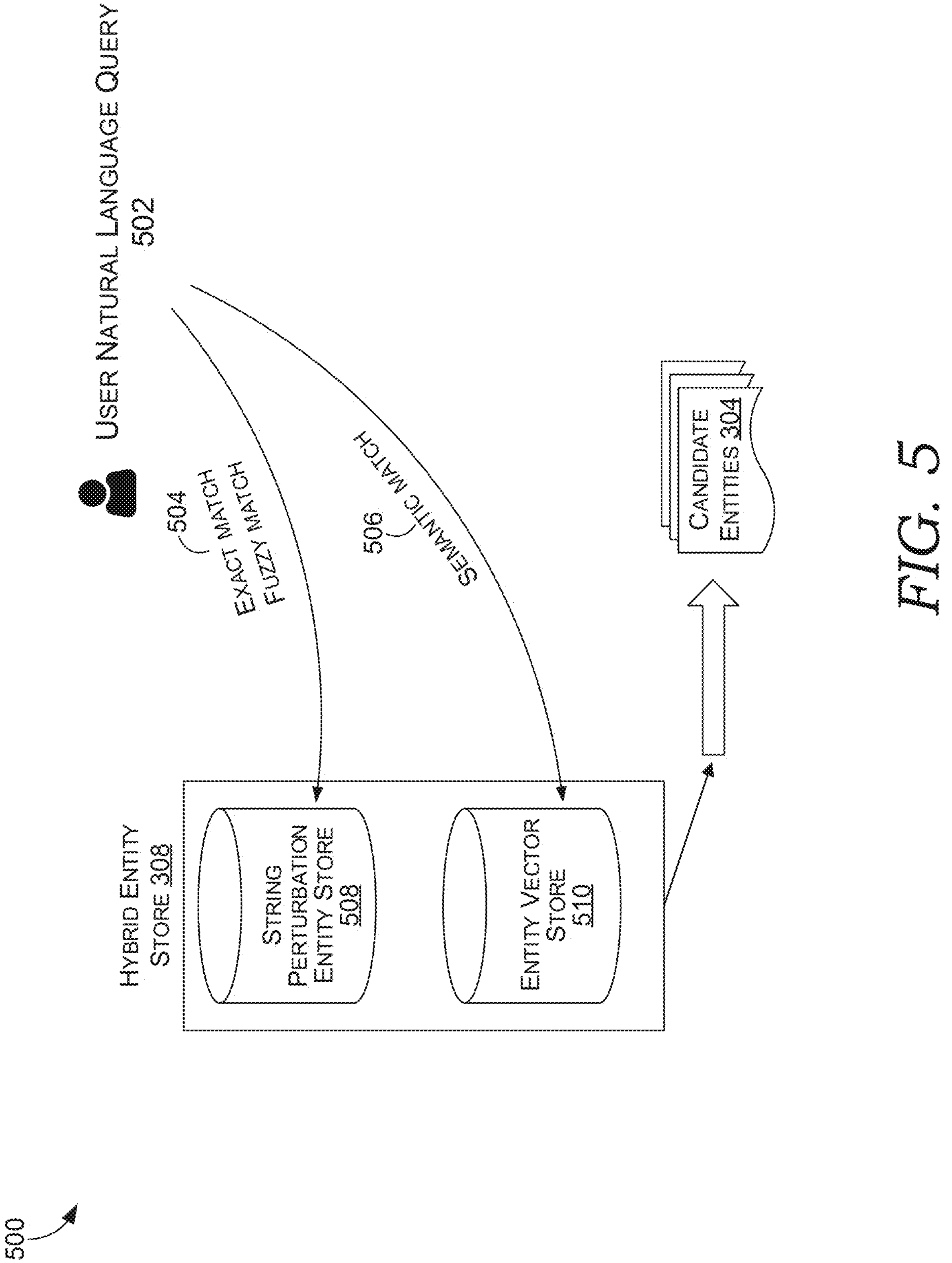
FIG. 5 provides an example diagram of determining candidate entities based on a query, in accordance with embodiments of the present disclosure.

In certain embodiments, a set of candidate entities from entities of a particular database are determined from both (1) a string match between the n-gram-based query candidates to string perturbations of entities of the particular database and (2) a semantic match between embeddings of the n-gram-based query candidates to embeddings of textual variations and classifications of the entities of the particular database. In this regard, the set of candidate entities include (1) string-similar entities where each string-similar entity, or string perturbation thereof, is above a threshold level of string similarity to at least one of the n-gram-based query candidates and (2) semantically similar entities where an embedding of each semantically similar entity is above a threshold level of semantic similarity to an embedding of at least one of the n-gram-based query candidates. An example diagram of determining candidate entities based on a query is shown in FIG. 5.

In certain embodiments, an entity linking engine enriches a particular database using hybrid entity linking that includes both (1) string-based entity linking and (2) semantic-based entity linking to facilitate NL2SQL queries. With respect to string-based entity linking, for each entity of the particular database, an entity-string perturbation engine generates string perturbations of the entity and stores the string perturbations in association with the entity in a data store. With respect to semantic-based entity linking, for each entity of the particular database, an entity-embedding generation engine generates embeddings based on the entity and stores the embeddings in association with the entity in a data store.

Figure 6:
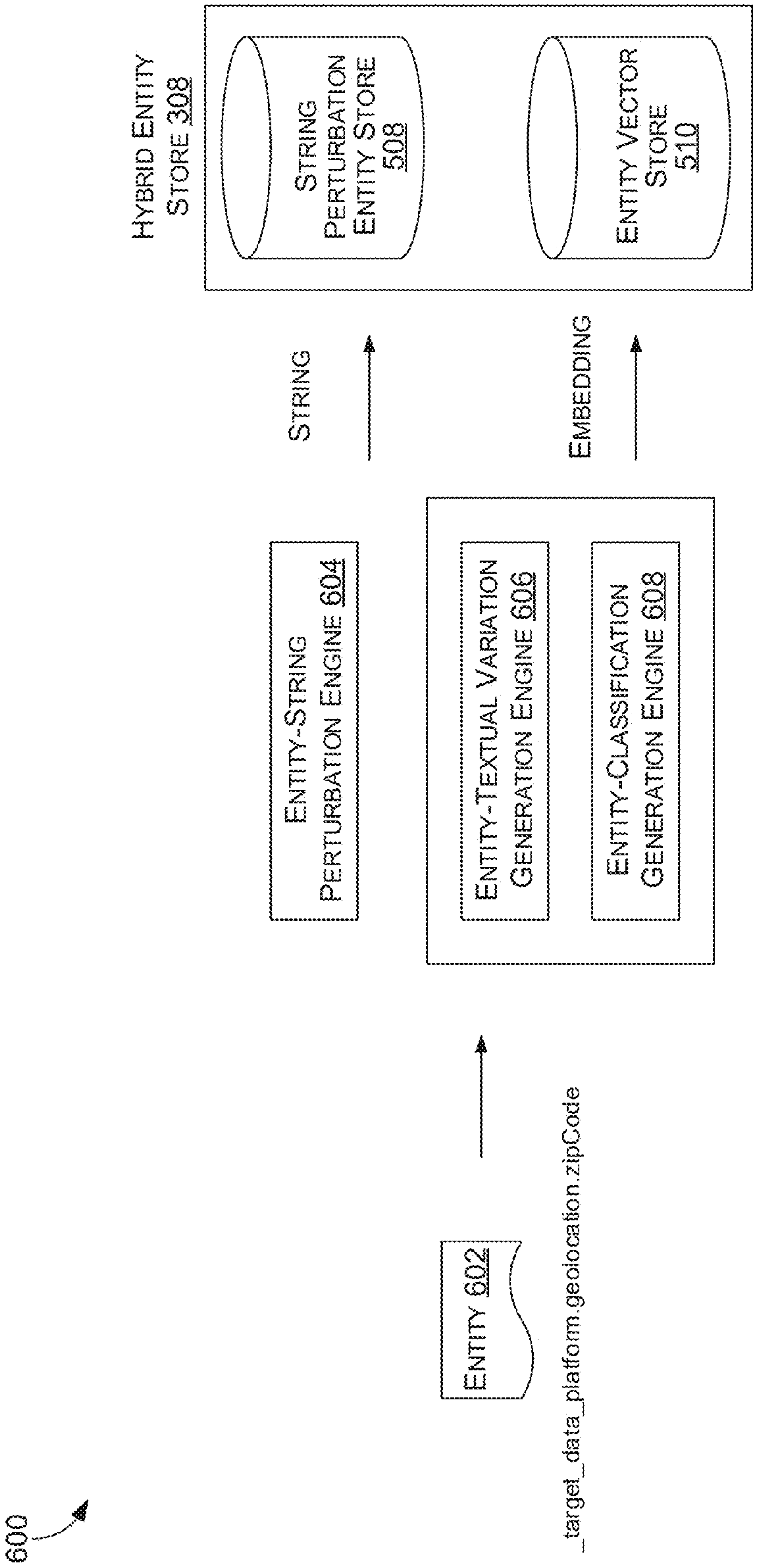
FIG. 6 provides an example diagram of facilitating using string-based entity linking and semantic-based entity linking to enrich a database, in accordance with embodiments of the present disclosure.

In certain embodiments, the entity-embedding generation engine generates embeddings of each entity by applying (1) the entity, (2) textual variations generated based on the entity, and/or (3) classifications generated based on the entity to an embedding model. An example of enriching a database by (1) generating string perturbations of entities of the database and (2) generating embeddings from textual variations and classifications of the entities of the database is shown in FIG. 6.

In certain embodiments, an entity-textual variation generation engine generates textual variations based on an entity by generating a prompt to a language model with the entity and instructions to generate the textual variations of the entity. Responsive to the instructions to generate the textual variations of the entity, the language model outputs textual variations of the entity. For example, for a given entity "_target_data_platform.geolocation.zipCode," language model 216 may output textual variations (1) "_target_data_platform postal code," (2) "_target_data_platform.geolocation.zip_code," (3) "_target_data_platform.geolocation.areaCode," (4) "Geographic postal code," and/or the like.

In certain embodiments, an entity-classification generation engine generates classifications based on an entity by generating a prompt to a language model with the entity and instructions to generate the classifications based on the type of entity. Responsive to the instructions to generate the classifications of the entity, the language model outputs classifications based on the entity. For example, for a given entity "userAccount.contactDetails.billingAddress," language model 216 may output classifications (1) "Contact Information," (2) Postal Address," (3) "Billing Information," and/or the like.

Figure 7:
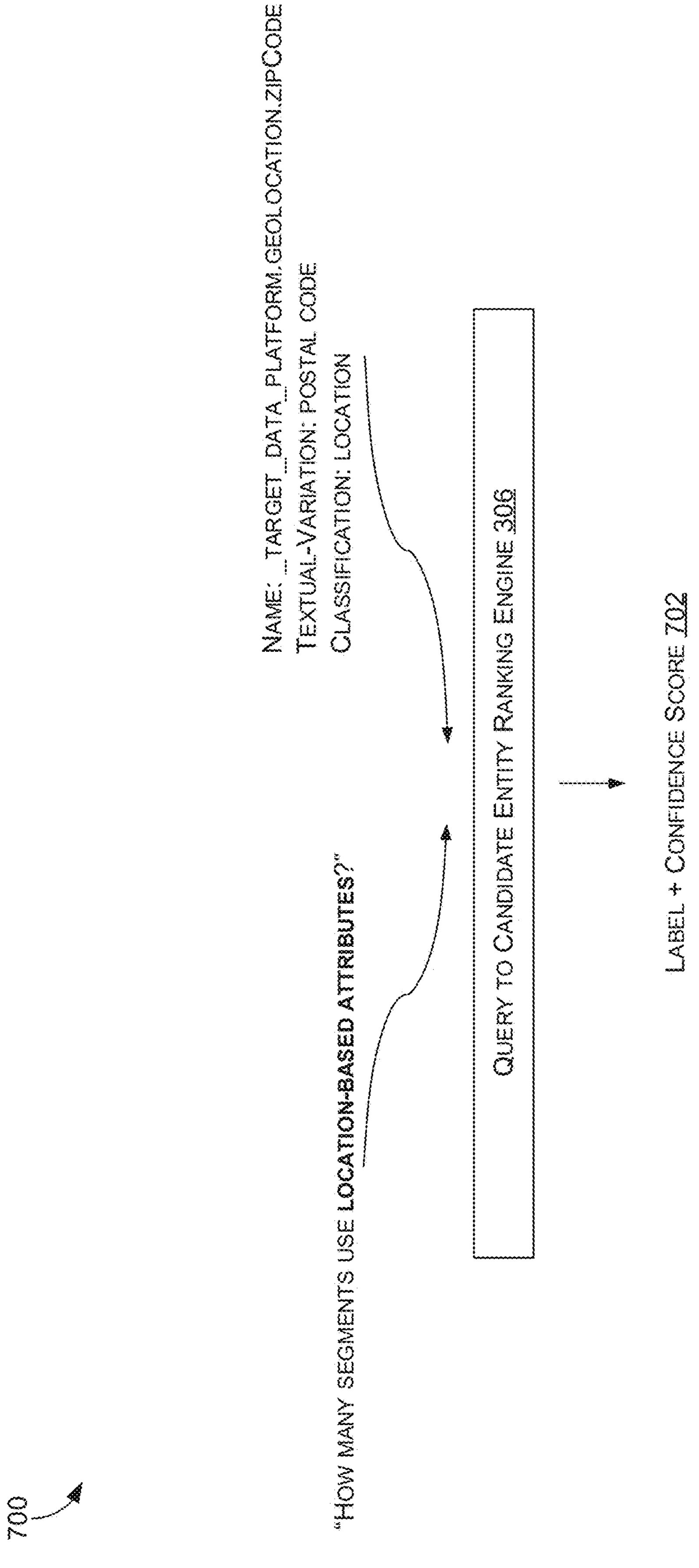
FIG. 7 provides an example diagram of ranking candidate entities based on a query, in accordance with embodiments of the present disclosure.

In certain embodiments, a ranked set of candidate entities are determined by a query to candidate entity ranking engine based on the input query and the set of candidate entities (e.g., both the string-similar entities and the semantically similar entities). In certain embodiments, the query to candidate entity ranking engine is trained to output a confidence score for each candidate entity based on whether the candidate entity is relevant to the input query. In some embodiments, the query to candidate entity ranking engine is a binary classifier that outputs a label indicating whether the candidate entity is relevant to the input query (e.g., where "0" indicates that the candidate entity is not relevant and a "1" indicates that the candidate entity is relevant) and the confidence score indicates the certainty of the classifier with respect to the prediction. In certain embodiments, query to candidate entity ranking engine takes as input a natural language query and each candidate entity with the textual variations and classifications generated based on the entity and outputs the confidence score and/or label based on whether the candidate entity is relevant to the input query. An example diagram of ranking candidate entities based on a query is shown in FIG. 7.

In certain embodiments, a query to candidate entity ranking training engine trains a query to candidate entity ranking engine to output a confidence score for each candidate entity based on whether the candidate entity is relevant to the input query. In certain embodiments, a query to candidate entity ranking training engine trains a query to candidate entity ranking engine for a particular database (e.g., a database of a particular business) so that the candidate entity ranking engine is trained based on the particular entities of the particular database.

Figure 8:
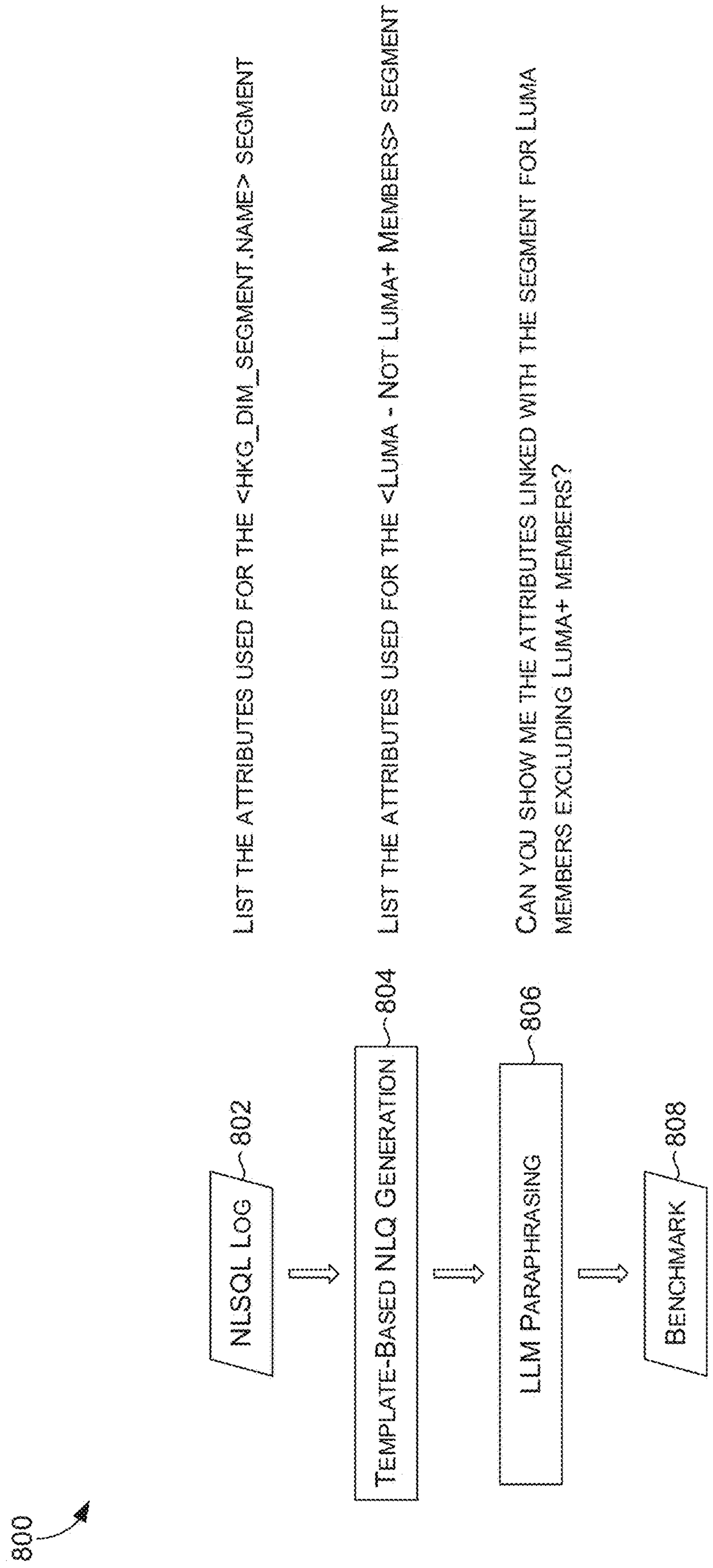
FIG. 8 provides an example diagram of generating benchmark data to train and/or validate a query to a candidate entity ranking engine, in accordance with embodiments of the present disclosure.

In certain embodiments, a query to candidate entity ranking training engine accesses a log of historical NL2SQL queries input by users querying the particular database and the corresponding entities accessed for each of the historical NL2SQL queries. Using the log of historical NL2SQL queries, the corresponding entities accessed for each of the historical NL2SQL queries and query templates, a query to candidate entity ranking training engine generates template-based NLQs for other entities and/or combinations of entities of the database based on each of the historical NL2SQL queries. A query to candidate entity ranking training engine generates a prompt to a language model with each of the template-based NLQs and instructions to generate NLQ variations of each of the template-based NLQs, such as by paraphrasing or rephrasing the template-based NLQs. In this regard, each of the generated variations of the template-based NLQs and corresponding entities referenced by the generated variations of the template-based NLQs can be used as training data to train a query to candidate entity ranking engine and/or validation data to assess the performance of the query to candidate entity ranking engine. An example diagram of generating benchmark data to train and/or validate a query to candidate entity ranking engine is shown in FIG. 8.

In certain embodiments, a subset of the ranked set of candidate entities above a threshold confidence score is determined. The subset of the ranked set of candidate entities can then be displayed in response to the natural language query. For example, the top subset of results (e.g., a single result or any number of results, such as the top two results, four results, or all results) can be displayed to the user responsive to the query.

Advantageously, efficiencies of computing and network resources can be enhanced using implementations described herein. In particular, using string-based entity linking and semantic-based entity linking to enrich a database to facilitate NL2SQL queries results in a more efficient use of computing resources (e.g., higher throughput and reduced latency for a network, lower packet generation costs, etc.) than conventional methods that result in providing inaccurate results to NL2SQL queries and/or that require specialized SQL syntax experience and knowledge of the particular database. For example, the technology described herein enables the efficient and effective enrichment of a database to facilitate NL2SQL queries by using both string-based entity linking and semantic-based entity linking, thereby reducing unnecessary computing resources used each time inaccurate results are presented in response to an NL2SQL query. Further, the technology described herein reduces the processing of inaccurate results in response to an NL2SQL query over a computer network, which results in higher throughput, reduced latency, and lower packet generation costs as fewer packets are sent over a network. Therefore, the technology described herein conserves network resources.

Overview of Exemplary Environments of Facilitating NL2SQL Queries Using String-Based Entity Linking and Semantic-Based Entity Linking to Enrich a Database Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 12.

It should be understood that operating environment 100 shown in FIG. 1 is an example of one suitable operating environment. Among other components not shown, operating environment 100 includes a user device 102, network 104, entity linking database query manager 108, and databases 112A-N. Operating environment 100 also shows example 106 of an NL2SQL query that is implemented using string-based entity linking and semantic-based entity linking to enrich a database to facilitate the NL2SQL query. Each of the components shown in FIG. 1 can be implemented via any type of computing device, such as one or more of computing device 1200 described in connection to FIG. 12, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a user querying a particular database, such as a database of a particular business). For example, in some implementations, such devices are the type of computing device described in relation to FIG. 12. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice.

User device 102 can be a client device on a client-side of operating environment 100, while entity linking database query manager 108 can be on a server-side of operating environment 100. Entity linking database query manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted that there is no requirement for each implementation that any combination of user device 102 or entity linking database query manager 108 remain as separate entities.

Application 110 operating on user device 102 can generally be any application capable of facilitating the exchange of information between the user device(s) and the entity linking database query manager 108 in facilitating NL2SQL queries using string-based entity linking and semantic-based entity linking to enrich a database. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, the application 110 can facilitate NL2SQL queries using string-based entity linking and semantic-based entity linking to enrich a database in an efficient and effective manner. In operation, a user searching a particular database (e.g., a database from databases 112A-N of FIG. 1), such as a database of a particular business, inputs a natural language query (e.g., "how many segments use location-based attributes?" of example 106) via application 110 on user device 102. N-gram-based query candidates are determined from the text of the query by entity linking database query manager 108, such as by breaking the query into each uni-gram, bi-gram, and tri-gram contiguous sequences of words of the query. A set of candidate entities from entities of the particular database are determined by entity linking database query manager 108 from both (1) a string match between the n-gram-based query candidates to string perturbations of entities of the particular database and (2) a semantic match between embeddings of the n-gram-based query candidates to embeddings of textual variations and classifications of the entities of the particular database. In order to facilitate the string match, entity linking database query manager 108 enriches the particular database by determining string perturbations of each entity of the particular database and storing the string perturbations in association with each corresponding entity. In order to facilitate the semantic match, entity linking database query manager 108 enriches the particular database by computing embeddings based on language model-generated textual variations and classifications of the entities and storing the embeddings in association with each corresponding entity. After the set of candidate entities are determined from the string match and the semantic match by entity linking database query manager 108, a binary classifier of entity linking database query manager 108, trained to output a confidence score for each candidate entity based on whether the candidate entity is relevant to the input query, determines a ranked set of candidate entities based on the input query and the set of candidate entities. A subset of the ranked set of candidate entities above a threshold confidence score determined by entity linking database query manager 108 can then be displayed in response to the natural language query via application 110 on user device 102. As can be understood from example 106, by facilitating NL2SQL queries for a particular database using hybrid entity linking that includes both (1) string-based entity linking and (2) semantic-based entity linking to enrich a database, NL2SQL query results are improved in an efficient and effective manner.

In certain embodiments, entity linking database query manager 108 can use any known NL2SQL technique to further process the query based on the ranked set of candidate entities, such as by outputting a translated SQL query based on the natural language query. As can be understood from example 106, NL2SQL techniques are applied by entity linking database query manager 108 to translate the NLQ "How many segments use location-based attributes?" to "SELECT* FROM HKG_DIM_ATTRIBUTE WHERE attribute='_target_data_platform.geolocation.zipCode'."

Entity linking database query manager 108 can be or include a server, including one or more processors, and one or more computer-readable media. The computer-readable media includes computer-readable instructions executable by the one or more processors. The instructions can optionally implement one or more components of entity linking database query manager 108, described in additional detail below with respect to the entity linking database query manager 202 of FIG. 2.

For cloud-based implementations, the instructions on entity linking database query manager 108 can implement one or more components, and application 110 can be utilized by a user to interface with the functionality implemented on entity linking database query manager 108. In some cases, application 110 comprises a web browser. In other cases, entity linking database query manager 108 may not be required. For example, the components of entity linking database query manager 108 may be implemented completely on a user device, such as user device 102. In this case, the entity linking database query manager 108 may be embodied at least partially by the instructions corresponding to application 110.

Thus, it should be appreciated that entity linking database query manager 108 may be provided via multiple devices arranged in a distributed environment that collectively provide the functionality described herein. Additionally, other components not shown may also be included within the distributed environment. In addition, or instead, entity linking database query manager 108 can be integrated, at least partially, into a user device, such as user device 102. Furthermore, entity linking database query manager 108 may at least partially be embodied as a cloud computing service.

Figure 2:
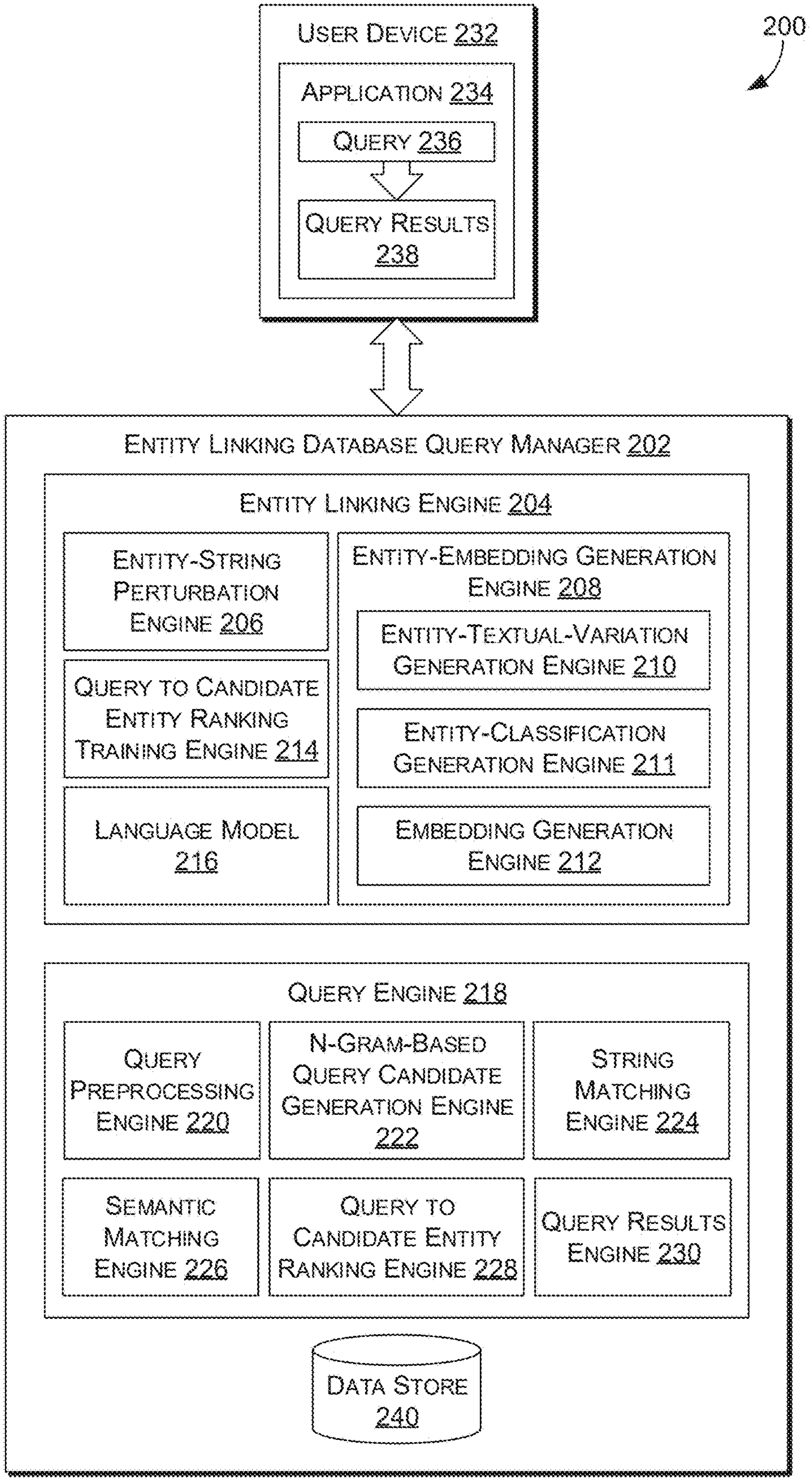
FIG. 2 depicts an example configuration of an operating environment in which some implementations of the present disclosure can be employed, in accordance with various embodiments of the present disclosure.

Referring to FIG. 2, aspects of an illustrative entity linking database query management system 200 are shown, in accordance with various embodiments of the present disclosure. At a high level, embodiments described herein facilitate NL2SQL queries using string-based entity linking and semantic-based entity linking to enrich a database. In this regard, an entity can be determined from a particular query based on candidate entities determined from both (1) a string matching algorithm between the particular query to string perturbations of entities of a database and (2) a semantic matching algorithm between an embedding of the particular query to embeddings of textual variations and classifications of the entities of the database.

As shown in FIG. 2, entity linking database query manager 202 includes an entity linking engine 204, a query engine 218, and data store 240. Entity linking engine 204 includes entity-string perturbation engine 206, entity-embedding generation engine 208 with entity-textual variation generation engine 210, entity-classification generation engine 211 and embedding generation engine 212, query to candidate entity ranking training engine 214, and language model 216. Query engine 218 includes query preprocessing engine 220, n-gram-based query candidate generation engine 222, string matching engine 224, semantic matching engine 226, query to candidate entity ranking engine 228, and query results engine 230. The foregoing components of entity linking database query manager 202 can be implemented, for example, in operating environment 100 of FIG. 1. In particular, those components may be integrated into any suitable combination of user devices 102 and/or entity linking database query manager 108.

Data store 240 can store computer instructions (e.g., software program instructions, routines, or services), data, and/or models used in embodiments described herein. In some implementations, data store 240 stores information or data received or generated via the various components of entity linking database query manager 202 and provides the various components with access to that information or data, as needed. Data store 240 may be embodied as one or more data stores, and the information in data store 240 may be distributed in any suitable manner across one or more data stores for storage (which may be hosted externally).

Entity linking engine 204 and its subcomponents (e.g., entity-string perturbation engine 206, entity-embedding generation engine 208 with entity-textual variation generation engine 210, entity-classification generation engine 211 and embedding generation engine 212, query to candidate entity ranking training engine 214, and language model 216) are generally configured to facilitate using string-based entity linking and semantic-based entity linking to enrich a database. Entity linking engine 204, and/or any of its subcomponents, can include rules, conditions, associations, models, algorithms, or the like to, for example, facilitate using string-based entity linking and semantic-based entity linking to enrich a database. For example, entity linking engine 204, and/or any of its subcomponents, may comprise NLP techniques, statistical models, fuzzy logic, neural networks, finite state machines, support vector machines, logistic regression, clustering, or machine learning techniques, similar statistical classification processes, or combinations of these to, for example, facilitate using string-based entity linking and semantic-based entity linking to enrich a database.

Query engine 218 and its subcomponents (e.g., query preprocessing engine 220, n-gram-based query candidate generation engine 222, string matching engine 224, semantic matching engine 226, query to candidate entity ranking engine 228, and query results engine 230) are generally configured to facilitate NL2SQL queries using a database enriched using string-based entity linking and semantic-based entity linking. Query engine 218, and/or any of its subcomponents, can include rules, conditions, associations, models, algorithms, or the like to, for example, facilitate NL2SQL queries using a database enriched using string-based entity linking and semantic-based entity linking. For example, query engine 218, and/or any of its subcomponents, may comprise NLP techniques, statistical models, fuzzy logic, neural networks, finite state machines, support vector machines, logistic regression, clustering, or machine learning techniques, similar statistical classification processes, or combinations of these to, for example, facilitate NL2SQL queries using a database enriched using string-based entity linking and semantic-based entity linking.

In operation, a user, such as a user querying a particular database (e.g., a database from databases 112A-N of FIG. 1), such as a database of a particular business, inputs a natural language query 236 via an application 234 through a user device 232. The natural language query is accessed by a query engine 218. In certain embodiments, a query preprocessing engine 220 preprocesses the query, such as by removing punctuation, dashes, underscores, and/or the like. An example diagram of facilitating NL2SQL queries using string-based entity linking and semantic-based entity linking to enrich a database is shown in FIG. 3. As can be understood from diagram 300 of FIG. 3, a natural language query (NLQ) is input ("How many segments use location-based attributes?") by a user to query a database. The query is preprocessed to remove the question mark and the dash. A query n-gram-based query candidate generation engine 302 generates n-gram-based query candidates from the query. The query and the n-gram-based query candidates are used to identify candidate entities 304 from the hybrid entity store 308. A query to candidate entity ranking engine 306 ranks the candidate entities 304 with respect to the input query in order to output the top candidate entities above a threshold ranking in response to the query.

Returning to FIG. 2, in certain embodiments, after preprocessing the query, n-gram-based query candidate generation engine 222 determines n-gram-based query candidates from the query. In certain embodiments, the n-gram-based query candidates can be generated by n-gram-based query candidate generation engine 222 by breaking the query into each contiguous sequence of words from each single word through the total number of words in the query. For example, for a query with four words, (1) uni-grams can be generated for each word in the query, (2) bi-grams can be generated for each contiguous sequence of two words in the query, (3) tri-grams can be generated for each contiguous sequence of three words in the query, (4) a quad-gram can be generated for the four contiguous words of the query, and/or any number of n-grams. In certain embodiments, the n-gram-based query candidates can be generated by only breaking the query into each uni-gram, bi-gram, and tri-gram contiguous sequences of words of the query.

An example of generating n-gram-based query candidates based on a query is shown in FIG. 4. As shown in diagram 400 of FIG. 4, the query "how many segments use location-based attributes" can be broken into n-gram-based query candidates by n-gram-based query candidate generation engine 302, including uni-grams ("how," "many," "segments," "use," "location," "based," and "attributes"), bi-grams ("how many," "many segments," "segments use," "use location," "location based," and "based attributes"), tri-grams ("how many segments," "many segments use," "segments use location," "use location based," and "location based attributes"), and/or any other n-grams.

Returning to FIG. 2, in certain embodiments, a set of candidate entities from entities of a particular database are determined from both (1) a string match performed by string matching engine 224 between the n-gram-based query candidates to string perturbations of entities of the particular database and (2) a semantic match performed by semantic matching engine 226 between embeddings of the n-gram-based query candidates to embeddings of textual variations and classifications of the entities of the particular database. In this regard, the set of candidate entities include (1) string-similar entities determined by string matching engine 224 where each string-similar entity, or string perturbation thereof, is above a threshold level of string similarity to at least one of the n-gram-based query candidates and (2) semantically similar entities determined by semantic matching engine 226 where an embedding of each semantically similar entity is above a threshold level of semantic similarity to an embedding of at least one of the n-gram-based query candidates. Any known string search technique can be used by string matching engine 224, such as an exact string match technique and/or a fuzzy string match technique. Any known semantic search techniques can be used by a semantic matching engine 226, such as Euclidean distance and/or cosine similarity.

An example diagram of determining candidate entities based on a query is shown in FIG. 5. As shown in diagram 500 of FIG. 5, a user natural language query 502 is input, and n-gram-based query candidates are determined from the user natural language query 602. A set of candidate entities 304 from entities of a database are determined from both (1) an exact match or fuzzy match 504 between the n-gram-based query candidates to string perturbations of entities of the database stored in string perturbation entity store 508 of hybrid entity store 308 and (2) a semantic match 506 between embeddings of the n-gram-based query candidates to embeddings of textual variations and classifications of the entities of the database stored in entity vector store 510 of hybrid entity store 308.

Returning to FIG. 2, in certain embodiments, entity linking engine 204 enriches a particular database (e.g., a database from databases 112A-N of FIG. 1) using string-based entity linking and semantic-based entity linking to facilitate NL2SQL queries. With respect to string-based entity linking, for each entity of the particular database, entity-string perturbation engine 206 generates string perturbations of the entity and stores the string perturbations in association with the entity in the data store 240. With respect to semantic-based entity linking, for each entity of the particular database, entity-embedding generation engine 208 generates embeddings based on the entity and stores the embeddings in association with the entity in the data store 240.

In certain embodiments, entity-string perturbation engine 206 generates string perturbations of each entity based on any known string perturbation technique. Examples of string perturbation techniques include variations, such as misspellings ("employee" to "emploee"), typographical errors ("employee" to "employee"), case changes ("Employee" to "EMPLOYEE"), synonyms ("employee" to "staff"), abbreviations ("department" to "dept"), word boundary changes ("employee_id" to "employeeid"), phonetic variations of similar sounding characters or words ("employee" to "emploi"), noise insertion to add random or specific characters ("employee" to "empl_oyee"), cultural variations to adapt spellings for different locales ("color" to "colour"), and/or the like.

In certain embodiments, entity-embedding generation engine 208 generates embeddings of each entity by applying (1) the entity, (2) textual variations generated based on the entity, and/or (3) classifications generated based on the entity to an embedding model (e.g., embedding generation engine 212). In certain embodiments, entity-textual variation generation engine 210 generates textual variations based on an entity by generating a prompt to language model 216 with the entity and instructions to generate the textual variations of the entity. In certain embodiments, the instructions to generate the textual variations of the entity further include examples of textual variations, such as examples of textual variations based on naming structures of the particular database. Responsive to the instructions to generate the textual variations of the entity by entity-textual variation generation engine 210, language model 216 outputs textual variations of the entity. For example, for a given entity "_target_data_platform.geolocation.zipCode," language model 216 may output textual variations (1) "_target_data_platform postal code," (2) "_target_data_platform.geolocation.zip_code," (3) "_target_data_platform.geolocation.areaCode," (4) "Geographic postal code," and/or the like. A specific example of a prompt to language model 216 by entity-textual variation generation engine 210 to generate textual variations of an entity is as follows:

> You are a human user generating imprecise phrases to refer to database entities. Your task is to create possible variations for a given entity.
>
> Entity: _target_data_platform.geolocation.zipCode.

In certain embodiments, the textual variations generated based on the entity by entity-textual variation generation engine 210 are stored in association with the entity in data store 240.

In certain embodiments, entity-classification generation engine 211 generates classifications based on an entity by generating a prompt to language model 216 with the entity and instructions to generate the classifications based on the type of entity. In certain embodiments, the instructions to generate the classifications based on the entity further include examples of classifications, such as examples of classifications based on types of entities using the naming structures of the particular database. Responsive to the instructions to generate the classifications of the entity by entity-classification generation engine 211, language model 216 outputs classifications based on the entity. For example, for a given entity "userAccount.contactDetails.billingAddress," language model 216 may output classifications (1) "Contact Information," (2) Postal Address," (3) "Billing Information," and/or the like. A specific example of a prompt to language model 216 by entity-classification generation engine 211 to generate textual variations of an entity is as follows:

Real-world entities can be classified into different types defined in many different knowledge graphs. Your job is to classify the following entity into several types.

Entity: userAccount.contactDetails.billingAddress.

In certain embodiments, the classifications generated based on the entity by entity-textual variation generation engine 210 are stored in association with the entity in data store 240.

In certain embodiments, embedding generation engine 212 generates the embedding based on (1) the entity, (2) a textual variation generated based on the entity, and/or (3) a classification generated based on the entity using any known embedding model, such as a transformer-based embedding model.

An example of enriching a database by (1) generating string perturbations of entities of the database and (2) generating embeddings from textual variations and classifications of the entities of the database is shown in FIG. 6. As shown in diagram 600 of FIG. 6, for each entity stored in a database (e.g., "_target_data_platform.geolocation.zipCode"), entity-string perturbation engine 604 generates string perturbations of the entity 602. The string perturbations of entity 602 are stored in association with entity 602 in string perturbation entity store 508 of hybrid entity store 308. Also, for each entity stored in the database, entity-textual variation generation engine 606 generates textual variations based on the entity 602, and entity-classification generation engine 608 generates classifications based on an entity 602. An embedding is generated for each entity based on the entity, the textual variation generated based on the entity, and the classification generated based on the entity. The embedding of the entity 602 is stored in association with the entity 602 in entity vector store 510 of hybrid entity store 308.

Returning to FIG. 2, in certain embodiments, a ranked set of candidate entities are determined by a query to candidate entity ranking engine 228 based on the input query and the set of candidate entities from entities determined by string matching engine 224 (e.g., the string-similar entities) and semantic matching engine 226 (e.g., the semantically similar entities). In certain embodiments, a query to candidate entity ranking engine 228 is trained to output a confidence score for each candidate entity based on whether the candidate entity is relevant to the input query. In some embodiments, the query to candidate entity ranking engine 228 is a binary classifier that outputs a label indicating whether the candidate entity is relevant to the input query (e.g., where "0" indicates that the candidate entity is not relevant and a "1" indicates that the candidate entity is relevant) and the confidence score indicating the certainty of the classifier with respect to the prediction. In certain embodiments, query to candidate entity ranking engine 228 takes as input a natural language query (e.g., query 236) and each candidate entity with the textual variations and classifications generated based on the entity (e.g., by entity-textual variation generation engine 210 and entity-classification generation engine 211, respectively) and outputs the confidence score and/or label based on whether the candidate entity is relevant to the input query.

An example diagram of ranking candidate entities based on a query is shown in FIG. 7. As shown in diagram 700 of FIG. 7, a query to candidate entity ranking engine 306 takes as input a natural language query ("how many segments use location-based attributes?") and each candidate entity (e.g., _target_data_platform.geolocation.zipCode) with the textual variation and classification generated based on the entity (e.g., "postal code" and "location," respectively) and outputs a label and confidence score 702 indicating whether the candidate entity is relevant to the input query.

In certain embodiments, the query to candidate entity ranking engine 228 is trained by a query to candidate entity ranking training engine 214. The query to candidate entity ranking training engine 214 trains query to candidate entity ranking engine 228 to output a confidence score for each candidate entity based on whether the candidate entity is relevant to the input query. In certain embodiments, a query to candidate entity ranking training engine 214 trains a query to candidate entity ranking engine 228 for a particular database (e.g., a database of a particular business) so that the candidate entity ranking engine 228 is trained based on the particular entities of the particular database.

In certain embodiments, query to candidate entity ranking training engine 214 accesses a log of historical NL2SQL queries input by users querying the particular database and the corresponding entities accessed for each of the historical NL2SQL queries. Using the log of historical NL2SQL queries, the corresponding entities accessed for each of the historical NL2SQL queries and query templates, a query to candidate entity ranking training engine 214 generates template-based NLQs for other entities and/or combinations of entities of the database based on each of the historical NL2SQL queries. In certain embodiments, a query to candidate entity ranking training engine 214 generates a prompt to language model 216 with each of the template-based NLQs and instructions to generate NLQ variations of each of the template-based NLQs, such as by paraphrasing or rephrasing the template-based NLQs. In this regard, each of the generated variations of the template-based NLQs and corresponding entities referenced by the generated variations of the template-based NLQs can be used as training data to train a query to candidate entity ranking engine 228 and/or validation data to assess the performance of the query to candidate entity ranking engine 228. In certain embodiments, query to candidate entity ranking training engine 214 includes each of the historical NL2SQL queries and/or each of the template-based NLQs in the prompt with further instructions to generate NLQ variations of each of the historical NL2SQL queries and/or each of the template-based NLQs. In this regard, each of the historical NL2SQL queries and/or each of the template-based NLQs (e.g., and corresponding entities referenced by each of the historical NL2SQL queries and/or each of the template-based NLQs)

can be used as training data to train a query to candidate entity ranking engine 228 and/or validation data to assess the performance of the query to candidate entity ranking engine 228.

An example diagram 800 of generating benchmark data to train and/or validate a query to candidate entity ranking engine is shown in FIG. 8. As can be understood, the NL2SQL log 802 is accessed. For example, the NL2SQL log 802 may include a historical query from a user "List the attributes used for the <hkg_dim_segment.name> segment." The NL2SQL log 802 is used to generate template-based NLQs 804. For example, based on the historical query "List the attributes used for the <hkg_dim_segment.name> segment," query templates can be used to generate template-based NLQs for other entities or combinations of entities of the database, such as "List the attributes used for the <Luma—Not Luma+ Members> segment." A language model can generate NLQ variations based on the template-based NLQs 806. For example, based on the template-based NLQ "List the attributes used for the <Luma—Not Luma+ Members> segment," a language model can generate NLQ variations, such as "Can you show me the attributes linked with the segment for Luma members excluding Luma+ members?" The NL2SQL log, template-based NLQs, and/or the generated NLQ variations of the template-based NLQs are used as benchmark data 808 to train and/or validate a query to candidate entity ranking engine.

Returning to FIG. 2, in certain embodiments, a subset of the ranked set of candidate entities above a threshold confidence score is determined by query results engine 230. The subset of the ranked set of candidate entities can then be displayed via application 234 on user device 232 in response to the natural language query as query results 238 by query results engine 230. For example, the top subset of results (e.g., a single result or any number of results, such as the top two results, four results, or all results) can be displayed to the user responsive to the query as query results 238 by query results engine 230. In certain embodiments, query results engine 230 can use any known NL2SQL technique to process the query and the subset of the ranked set of candidate entities determined by query to candidate entity ranking engine 228 to provide query results 238 in response to the query. For example, as shown in example 106 of FIG. 1, a query results engine can use any known NL2SQL technique to process the query based on the ranked set of candidate entities, such as by outputting a translated SQL query based on the natural language query.

Figure 9:
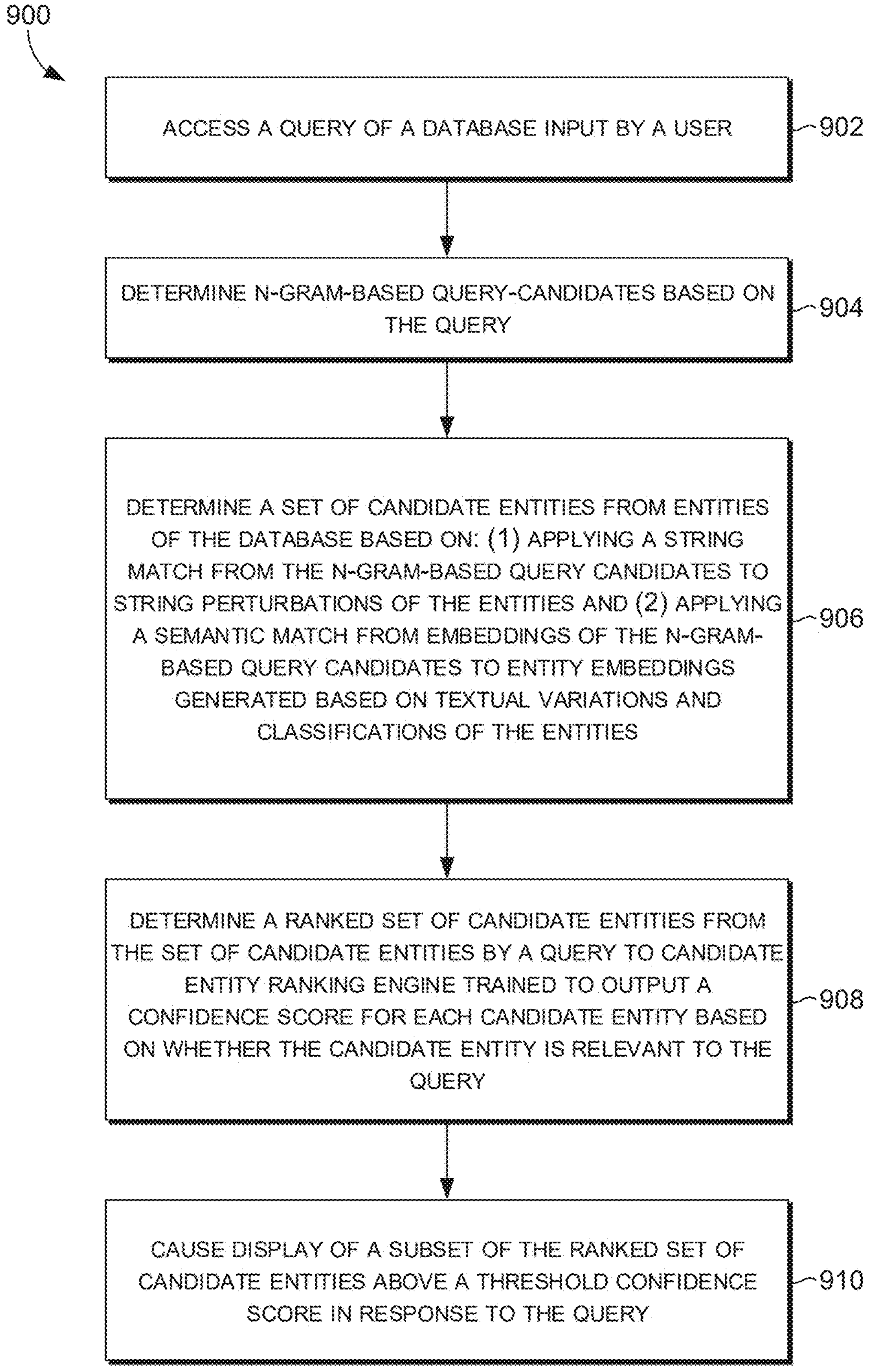
FIG. 9 is a process flow showing a method for facilitating NL2SQL queries using string-based entity linking and semantic-based entity linking to enrich a database, in accordance with embodiments of the present disclosure.
Figure 10:
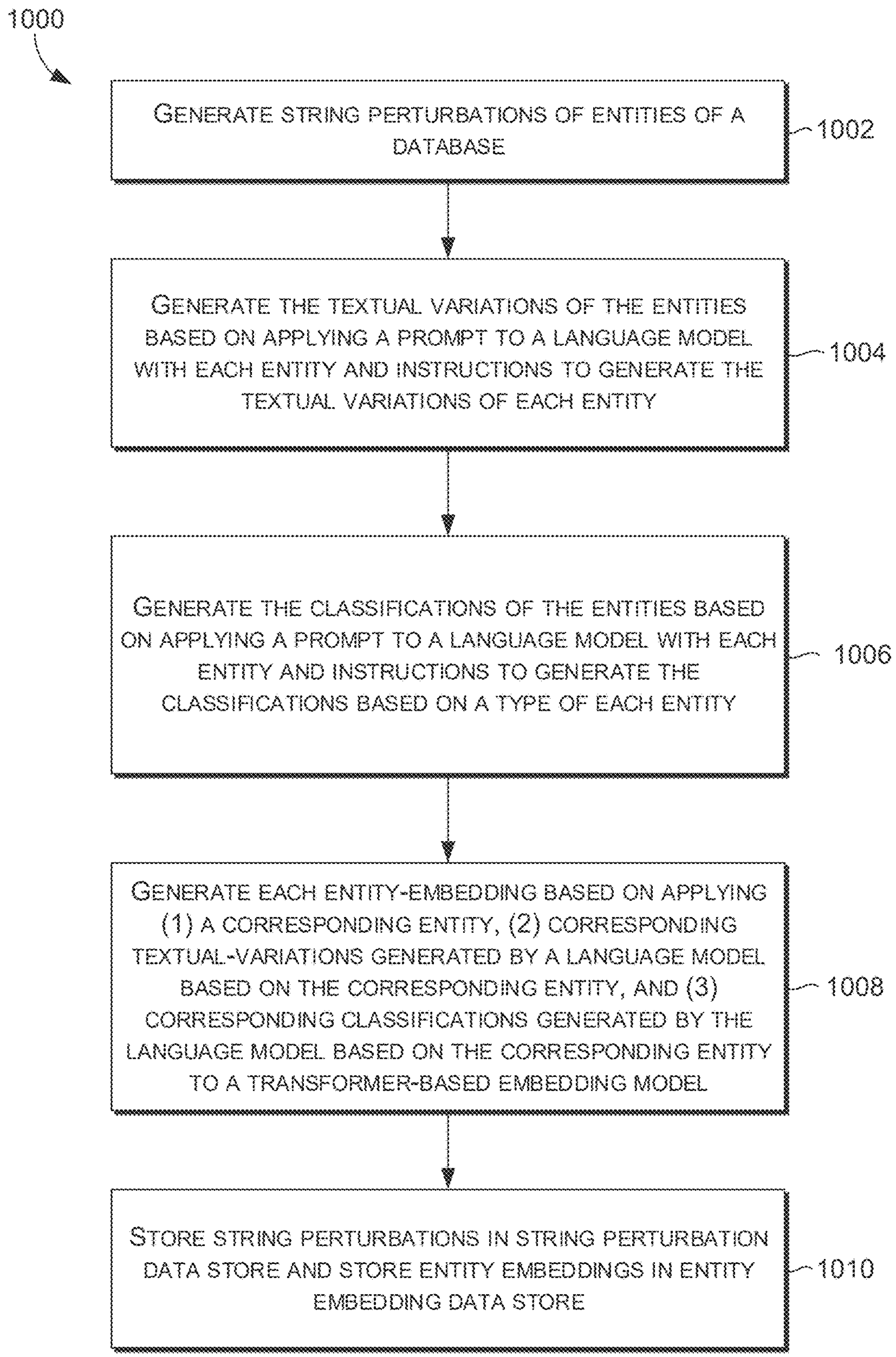
FIG. 10 is a process flow showing a method for facilitating string-based entity linking and semantic-based entity linking to enrich a database to facilitate NL2SQL queries, in accordance with embodiments of the present disclosure.
Figure 11:
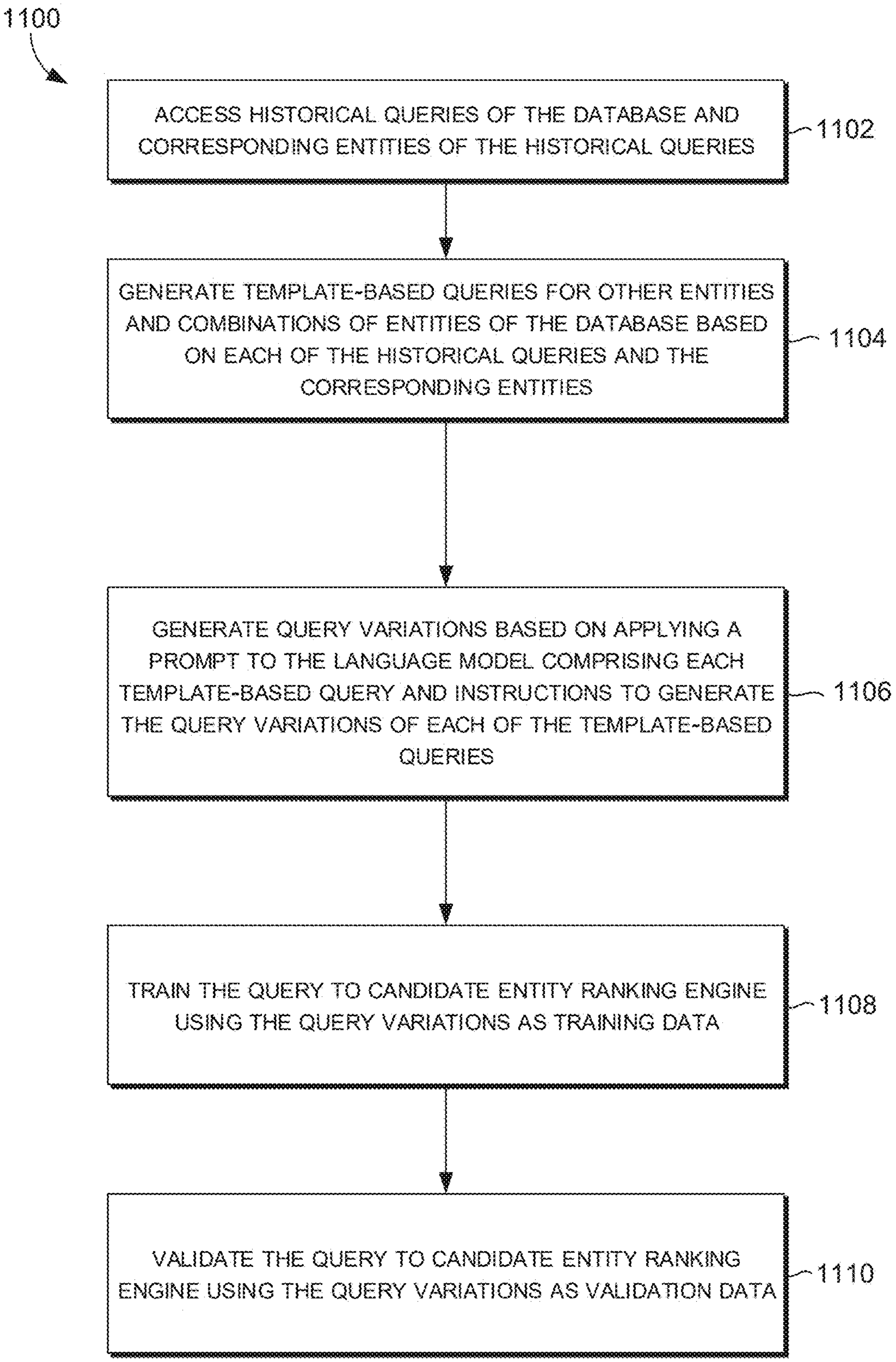
FIG. 11 is a process flow showing a method for training a query to a candidate entity ranking engine to facilitate NL2SQL queries that utilize a database enriched by string-based entity linking and semantic-based entity linking, in accordance with embodiments of the present disclosure.

Exemplary Implementations of Facilitating NL2SSQL Queries Using String-Based Entity Linking and Semantic-Based Entity Linking to Enrich a Database With reference now to FIGS. 9-11, FIGS. 9-11 provide method flows related to facilitating NL2SQL queries using string-based entity linking and semantic-based entity linking to enrich a database, in accordance with embodiments of the present technology. Each block of method 900, 1000, and 1100 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 9-11 are exemplary only and not intended to be limiting. As can be appreciated, in some embodiments, method flows 900-1100 can be implemented, at least in part, to facilitate NL2SQL queries using string-based entity linking and semantic-based entity linking to enrich a database.

Turning to FIG. 9, a flow diagram 900 is provided showing an embodiment of a method 900 for facilitating NL2SQL queries using string-based entity linking and semantic-based entity linking to enrich a database, in accordance with embodiments described herein. Initially, at block 902, a query of a database input by a user is accessed. For example, a user inputs an NLQ of a particular SQL database corresponding to a database of a particular business.

At block 904, n-gram-based query candidates are determined based on the query. In some embodiments, the n-gram-based query candidates are determined by breaking the query into contiguous sequences of words where each contiguous sequence of words corresponds to each n-gram-based query candidate. In some embodiments, the n-gram-based query candidates are determined by breaking the query into contiguous sequences of words only corresponding to each uni-gram, bi-gram, and tri-gram of the natural language query where each contiguous sequence of words corresponds to each n-gram-based query candidate.

At block 906, a set of candidate entities is determined from entities of the database based on: (1) applying a string match from the n-gram-based query candidates to string perturbations of the entities and (2) applying a semantic match from embeddings of the n-gram-based query candidates to entity embeddings (e.g., where each entity embedding is an embedding that corresponds to a particular entity) generated based on textual variations and classifications of the entities. In some embodiments, the string match is based on an exact match and/or a fuzzy match. In some embodiments, the semantic match is based on cosine similarity. In some embodiments, the semantic match is based on Euclidean distance. In some embodiments, the embeddings and/or entity embeddings are generated using a transformer-based embedding model.

At block 908, a ranked set of candidate entities is determined from the set of candidate entities by a query to a candidate entity ranking engine trained to output a confidence score for each candidate entity based on whether the candidate entity is relevant to the query. In some embodiments, the query to candidate entity ranking engine is a binary classifier that outputs a label indicating whether each candidate entity is relevant to the query and the confidence score indicating a probability corresponding to a predictive accuracy of the label. In some embodiments, the query to candidate entity ranking engine takes as input the query and each candidate entity with the textual variations and classifications generated based on the entity and outputs the confidence score and/or label based on whether the candidate entity is relevant to the input query.

At block 910, a subset of the ranked set of candidate entities above a threshold confidence score are displayed to the user in response to the query. For example, the top subset of results (e.g., a single result or any number of results, such as the top two results, four results, or all results) can be displayed to the user responsive to the query. In some embodiments, any known NL2SQL technique can be used to further process the query and the subset of the ranked set of candidate entities to provide a response to the query.

Turning now to FIG. 10, a flow diagram 1000 is provided showing an embodiment of a method 1000 for facilitating string-based entity linking and semantic-based entity linking to enrich a database to facilitate NL2SQL queries, in accordance with embodiments described herein. Initially, at block 1002, string perturbations are generated based on the entities of a database, such as a particular SQL database corresponding to a database of a particular business. In some embodiments, the string perturbations of the entities are generated using misspellings, typographical errors, case changes, abbreviations, word boundary changes, phonetic variations, noise insertion, and/or cultural variations.

At block 1004, textual variations of the entities are generated based on applying a prompt to a language model with each entity and instructions to generate the textual variations of each entity. Responsive to the instructions to generate the textual variations of the entity, the language model outputs textual variations of the entity. In some embodiments, the instructions to generate the textual variations of the entity further include examples of textual variations, such as examples of textual variations based on naming structures of the particular database. In some embodiments, the textual variations generated based on the entity are stored in association with the entity.

At block 1006, the classifications of the entities are generated based on applying a prompt to a language model with each entity and instructions to generate the classifications based on a type of each entity. Responsive to the instructions to generate the classifications of the entity, the language model outputs classifications based on the entity. In some embodiments, the instructions to generate the classifications based on the entity further include examples of classifications, such as examples of classifications based on types of entities using the naming structures of the particular database. In some embodiments, the classifications generated based on the entity are stored in association with the entity.

At block 1008, each entity embedding of the entity embeddings is generated based on applying (1) a corresponding entity, (2) corresponding textual variations generated by a language model based on the corresponding entity, and (3) corresponding classifications generated by the language model based on the corresponding entity to a transformer-based embedding model. In some embodiments, the entity embeddings are generated using a transformer-based embedding model.

At block 1010, the string perturbations of the entities are stored in a string perturbation data store, such as a data store optimized for string match techniques, in association with the corresponding entities. The entity embeddings of the entities are stored in an entity embedding data store, such as a data store optimized for semantic match techniques, in association with the corresponding entities.

Turning now to FIG. 11, a flow diagram 1000 is provided showing an embodiment of a method 1100 for training a query to candidate entity ranking engine to facilitate NL2SQL queries that utilize a database enriched by string-based entity linking and semantic-based entity linking, in accordance with embodiments described herein. Initially, at block 1102, historical queries of the database and corresponding entities of the historical queries are accessed. For example, historical natural language queries input by users to query a database, such as a particular SQL database corresponding to a database of a particular business, are accessed.

At block 1104, template-based queries for other entities and combinations of entities of the database are generated based on each of the historical queries and the corresponding entities. For example, entities of the historical queries are replaced with other entities and/or combinations of entities of the database in order to generate the template-based queries.

At block 1106, query variations are generated based on applying a prompt to the language model comprising each template-based query and instructions to generate the query variations of each of the template-based queries. In this regard, each of the generated variations of the template-based NLQs and corresponding entities referenced by the generated variations of the template-based NLQs can be used as training data to train a query to candidate entity ranking engine and/or validation data to assess the performance of the query to candidate entity ranking engine.

At block 1108, the query to candidate entity ranking engine is trained using the query variations as training data. For example, a portion of the query variations, template-based queries, and/or historical queries can be used as training data to train the query to candidate entity ranking engine.

At block 1110, the query to candidate entity ranking engine is validated using the query variations as validation data. For example, the portion of the query variations, template-based queries, and/or historical queries that were not used as training data can be used as validation data to generate performance metrics that assess the performance of the query to a candidate entity ranking engine.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 12:
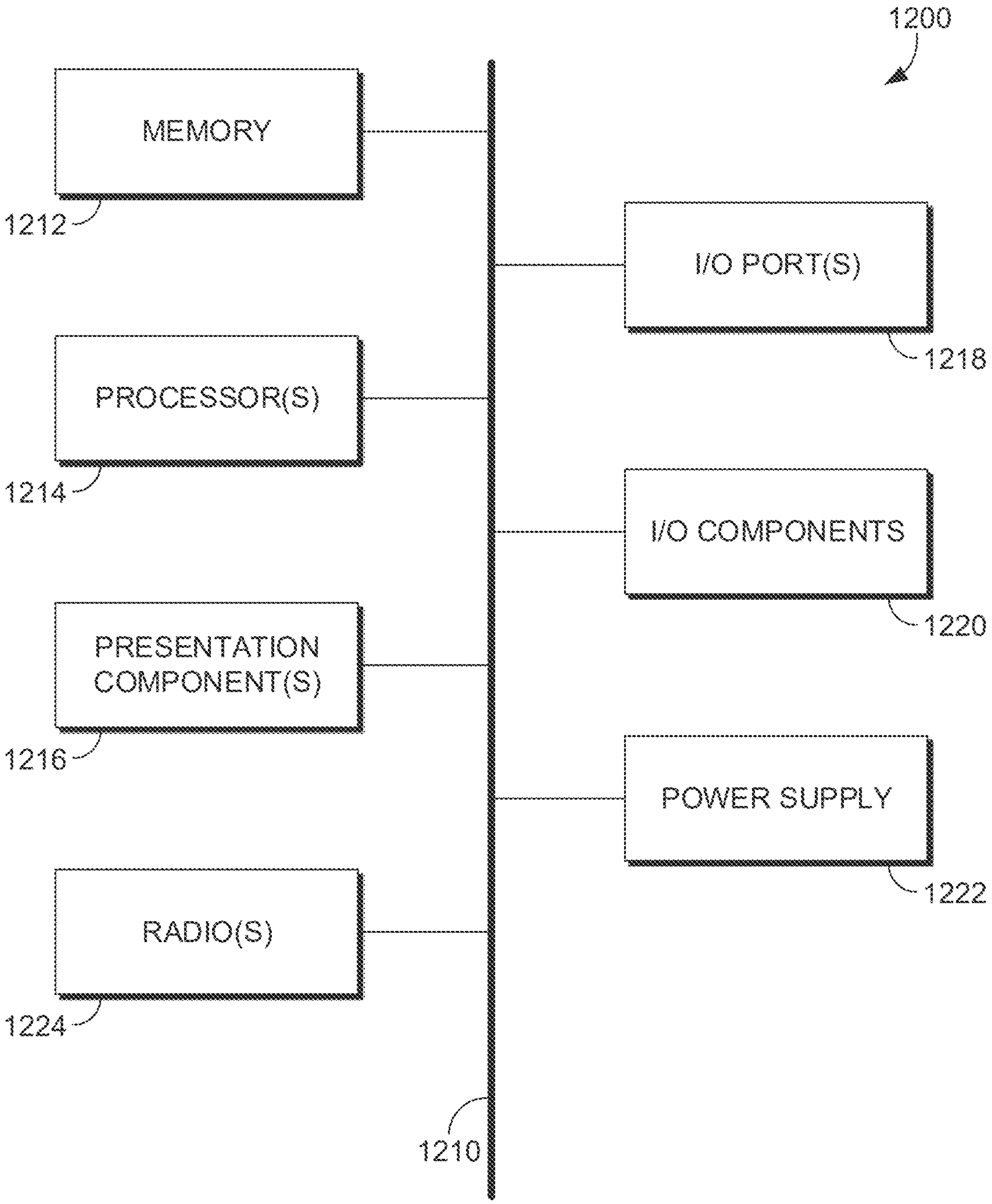
FIG. 12 is a block diagram of an example computing device in which embodiments of the present disclosure can be employed.

Referring to the drawings in general, and initially to FIG. 12 in particular, an exemplary operating environment for implementing aspects of the technology described herein is shown and designated generally as computing device 1200. Computing device 1200 is just one example of a suitable computing environment and is not intended to suggest any limitation as to the scope of use or functionality of the technology described herein. Neither should the computing device 1200 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 12, computing device 1200 includes a bus 1210 that directly or indirectly couples the following devices: memory 1212, one or more processors 1214, one or more presentation components 1216, input/output (I/O) ports 1218, I/O components 1220, an illustrative power supply 1222, and a radio(s) 1224. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 12 is merely illustrative of an exemplary computing device that can be used in connection with one or more aspects of the technology described herein. Distinction is not made between such categories as "workstation," "server," "laptop," and "handheld device," as all are contemplated within the scope of FIG. 12 and refer to "computer" or "computing device."

Computing device 1200 typically includes a variety of computer-readable media. Computer-readable media can be any available media that can be accessed by computing device 1200 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile and/or nonvolatile memory. The memory 1212 may be removable, non-removable, or a combination thereof. Exemplary memory includes solid-state memory, hard drives, and optical-disc drives. Computing device 1200 includes one or more processors 1214 that read data from various entities such as bus 1210, memory 1212, or I/O components 1220. Presentation component(s) 1216 present data indications to a user or other device. Exemplary presentation components 1216 include a display device, speaker, printing component, and vibrating component. I/O port(s) 1218 allow computing device 1200 to be logically coupled to other devices including I/O components 1220, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1214 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1200. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

A computing device may include radio(s) 1224. The radio 1224 transmits and receives radio communications. The computing device may be a wireless terminal adapted to receive communications and media over various wireless networks. Computing device 1200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. One or more computer-readable media having a plurality of executable instructions embodied thereon, which, when executed by one or more processors, cause the one or more processors to perform a method comprising:
- accessing a query of a database, wherein the query is a natural language query;
- determining, by a string matching engine and a semantic matching engine, a set of candidate entities from entities of the database based on:
  - identifying string match candidate entities by applying, by the string matching engine, a string match from n-gram-based query candidates of the query to string perturbations of the entities of the database;
  - identifying semantic match candidate entities by applying, by the semantic matching engine, a semantic match from embeddings of the n-gram-based query candidates to entity embeddings generated based on the entities of the database, textual variations of the entities of the database and classifications of the entities of the database; and
  - combining the string match candidate entities and the semantic match candidate entities to form the set of candidate entities;
- determining, by a ranking engine, a ranked set of candidate entities from the set of candidate entities; and
- causing display of a subset of the ranked set of candidate entities above a threshold score in response to the query.

2. The one or more computer-readable media of claim 1, the method further comprising:
- generating the textual variations of the entities based on applying a prompt to a language model with each entity and instructions to generate the textual variations of each entity.

3. The one or more computer-readable media of claim 1, the method further comprising:
- generating the classifications of the entities based on applying a prompt to a language model with each entity and instructions to generate the classifications based on a type of each entity.

4. The one or more computer-readable media of claim 1, the method further comprising:
- generating each entity embedding of the entity embeddings based on applying (1) a corresponding entity, (2) corresponding textual variations generated by a language model based on the corresponding entity, and (3) corresponding classifications generated by the language model based on the corresponding entity to a transformer-based embedding model.

5. The one or more computer-readable media of claim 1, the method further comprising:
- generating the string perturbations of the entities using at least one of misspellings, typographical errors, case changes, abbreviations, word boundary changes, phonetic variations, noise insertion, or cultural variations.

6. The one or more computer-readable media of claim 1, the method further comprising:
- training the ranking engine to output a confidence score for each candidate entity of the set of candidate entities based on whether the candidate entity is relevant to the query by:
  - accessing historical queries of the database and corresponding entities of the historical queries;
  - generating template-based queries for other entities and combinations of the entities of the database based on each of the historical queries and the corresponding entities;
  - generating query variations based on applying a prompt to a language model comprising each template-based query and instructions to generate the query variations of each of the template-based queries; and
  - training the ranking engine using the query variations as training data.

7. The one or more computer-readable media of claim 1, wherein the ranking engine comprises a binary classifier trained to output a label indicating whether each candidate entity of the set of candidate entities is relevant to the query and a confidence score indicating a probability corresponding to a predictive accuracy of the label.

8. The one or more computer-readable media of claim 1, the method further comprising:
- determining the n-gram-based query candidates by breaking the query into contiguous sequences of words, each contiguous sequence of words corresponding to each n-gram-based query candidate.

9. The one or more computer-readable media of claim 1, the method further comprising:
- determining the n-gram-based query candidates by breaking the query into contiguous sequences of words only corresponding to each uni-gram, bi-gram, and tri-gram of the natural language query, each contiguous sequence of words corresponding to each n-gram-based query candidate.

10. A computer-implemented method comprising:
- determining, by an n-gram-based query candidate generation engine, n-gram-based query candidates based on a natural language query (NLQ) of a structured query language (SQL) database;
- determining, by a string matching engine and a semantic matching engine, a set of candidate entities from entities of the SQL database based on:
  - identifying string match candidate entities by applying, by the string matching engine, a string match from the n-gram-based query candidates to string perturbations of the entities;
  - identifying semantic match candidate entities by applying, by the semantic matching engine, a semantic match from embeddings of the n-gram-based query candidates to entity embeddings generated based on the entities of the SQL database, textual variations of the entities of the SQL database and classifications of the entities of the SQL database; and
  - combining the string match candidate entities and the semantic match candidate entities to form the set of candidate entities;
- determining, by a ranking engine, a ranked set of candidate entities from the set of candidate entities; and
- causing display of a subset of the ranked set of candidate entities above a threshold confidence score in response to the NLQ.

11. The computer-implemented method of claim 10, further comprising:

generating the textual variations of the entities based on applying a prompt to a language model with each entity and instructions to generate the textual variations of each entity.

12. The computer-implemented method of claim 10, further comprising:

generating the classifications of the entities based on applying a prompt to a language model with each entity and instructions to generate the classifications based on a type of each entity.

13. The computer-implemented method of claim 10, further comprising:

generating each entity embedding of the entity embeddings based on applying (1) a corresponding entity, (2) corresponding textual variations generated by a language model based on the corresponding entity, and (3) corresponding classifications generated by the language model based on the corresponding entity to a transformer-based embedding model.

14. The computer-implemented method of claim 10, further comprising:

generating the string perturbations of the entities using at least one of misspellings, typographical errors, case changes, abbreviations, word boundary changes, phonetic variations, noise insertion, or cultural variations.

15. The computer-implemented method of claim 10, further comprising:

training the ranking engine to output a confidence score for each candidate entity of the set of candidate entities based on whether the candidate entity is relevant to the NLQ by:

accessing historical NLQs of the SQL database and corresponding entities of the historical NLQs;

generating template-based NLQs for other entities and combinations of the entities of the SQL database based on each of the historical NLQs and the corresponding entities;

generating NLQ variations based on applying a prompt to a language model comprising each template-based NLQ and instructions to generate the NLQ variations of each of the template-based NLQs; and training the ranking engine using the NLQ variations as training data.

16. The computer-implemented method of claim 10, wherein the ranking engine comprises a binary classifier trained to output a label indicating whether each candidate entity of the set of candidate entities is relevant to the NLQ and a confidence score indicating a probability corresponding to a predictive accuracy of the label.

17. The computer-implemented method of claim 10, wherein determining the n-gram-based query candidates further comprises:

breaking the NLQ into contiguous sequences of words, each contiguous sequence of words corresponding to each n-gram-based query candidate.

18. The computer-implemented method of claim 10, wherein determining the n-gram-based query candidates further comprises:

breaking the NLQ into contiguous sequences of words only corresponding to each uni-gram, bi-gram, and tri-gram of the natural language query, each contiguous sequence of words corresponding to each n-gram-based query candidate.

19. A computing system comprising:

a processor; and a non-transitory computer-readable medium having stored thereon instructions that when executed by the processor, cause the processor to perform operations including:

accessing a natural language query (NLQ) of a particular structured query language (SQL) database;

determining, by an n-gram-based query candidate generation engine, n-gram-based query candidates based on the NLQ by breaking the NLQ into contiguous sequences of words, each contiguous sequence of words corresponding to each n-gram-based query candidate;

determining, by a string matching engine and a semantic matching engine, a set of candidate entities from entities of the particular SQL database based on:

identifying string match candidate entities by applying, by the string matching engine, a string match from the n-gram-based query candidates to string perturbations of the entities;

identifying semantic match candidate entities by applying, by the semantic matching engine, a semantic match from embeddings of the n-gram-based query candidates to entity embeddings generated based on the entities of the particular SQL database, textual variations of the entities of the particular SQL database and classifications of the entities of the particular SQL database; and combining the string match candidate entities and the semantic match candidate entities to form the set of candidate entities;

determining a ranked set of candidate entities from the set of candidate entities by a classifier trained to output a confidence score for each candidate entity based on whether the candidate entity is relevant to the NLQ; and causing display of a subset of the ranked set of candidate entities above a threshold confidence score in response to the NLQ.

20. The computing system of claim 19, the operations further including:

generating the textual variations of the entities based on applying a first prompt to a language model with each entity and instructing the language model to generate the textual variations of each entity;

generating the classifications of the entities based on applying a second prompt to the language model with each entity and instructing the language model to generate the classifications based on a type of each entity; and generating each entity embedding of the entity embeddings based on applying (1) a corresponding entity, (2) corresponding textual variations generated by the language model based on the corresponding entity, and (3) corresponding classifications generated by the language model based on the corresponding entity to a transformer-based embedding model.

* * * * *